(No Model.)
H. MACHIN.
COUPLING FOR WATER CLOSET BOWLS, &c.
No. 398,838. Patented Mar. 5, 1889.
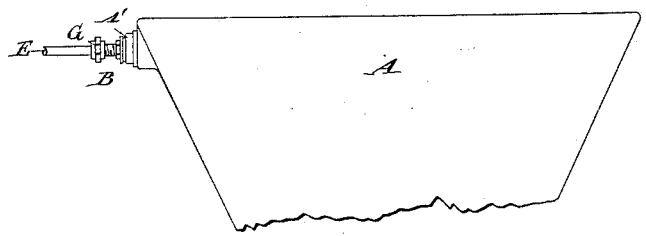
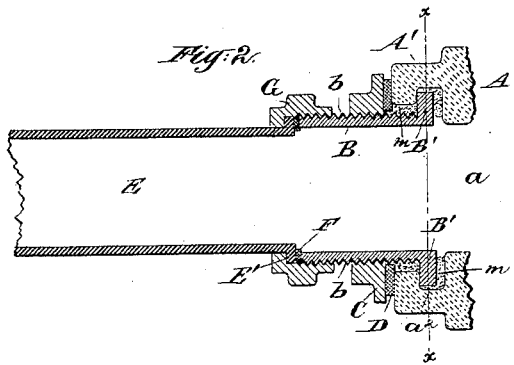
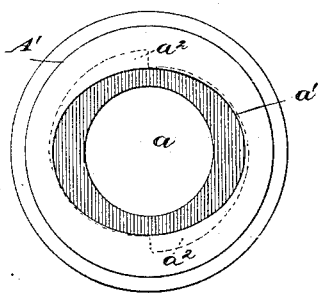
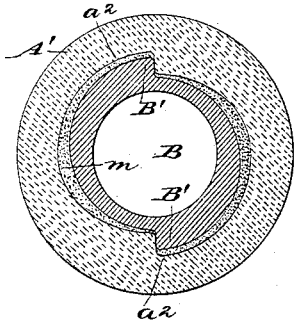
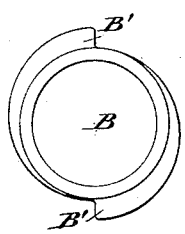
Witnesses:
Charles R. Searle,
H. A. Johnstone.
Inventor:
Herbert Machin
by his attorneys
Thomas Dyer Stetson
N. PETERS, Photo-Lithographer, Washington, D. C.

UNITED STATES PATENT OFFICE.

HERBERT MACHIN, OF TRENTON, NEW JERSEY, ASSIGNOR TO THE EQUITABLE POTTERY COMPANY, OF SAME PLACE.

COUPLING FOR WATER-CLOSET BOWLS, &c.

SPECIFICATION forming part of Letters Patent No. 398,838, dated March 5, 1889.

Application filed November 15, 1888. Serial No. 290,872. (No model.)

*To all whom it may concern:*

Be it known that I, HERBERT MACHIN, of Trenton, in the county of Mercer and State of New Jersey, have invented a certain new and useful Improvement in Couplings for Water-Closet Bowls and other Crockery or Earthenware Articles, of which the following is a specification.

It has been long proposed to lock pipes to water-closet bowls and analogous crockery articles by provisions analogous to what is known as a "bayonet-joint;" but, so far as I am aware, all have the crockery portion too weak to properly endure the strains to which they are liable to be subjected. I have discovered that it is practicable to make the metallic coupling-piece with less breadth of wings than usual and to make the crockery with greater breadth, and, furthermore, that by making the coupling-wings each with an offset on one edge, and making the crockery with recesses having corresponding offsets, I can form the front or mouth of the crockery portion with an oval outline without offset and secure a degree of strength in the crockery front not heretofore attained. The wings on the metallic part need not have offsets on each edge. It is, on the contrary, preferable to form the wings each with one edge gradually contracted.

My crockery pipe is round on the outside and has an oval inlet with inner recesses on each side of the short axis of the oval. These recesses are so arranged that when I insert a metal pipe with two partial flanges or wings, arranged and proportioned as shown farther on, the said flanges or wings make the metal pipe substantially oval, like the oval opening in the crockery pipe. Being smaller it readily goes in when applied in the correct position. Then one quarter-turn carries the wings into the recesses in the sides of the oval hole in the crockery. In other words, the long axis of the metal oval locks in the recesses of the short axis of the oval in the crockery. These lock it strongly. Afterward I apply cement to fill all the spaces remaining in the joint.

In what I esteem the most complete form of the invention I use a rubber or leather washer and white lead, and I put a nut on the thread of the metal pipe and screw down on the washer to make the joint more certainly water-tight—the same as plumbers put rubber and white lead on steam-joints to insure tightness.

The accompanying drawings form a part of this specification and represent what I consider the best means of carrying out the invention.

Figure 1 is a side elevation. The remaining figures are on a larger scale. Fig. 2 is a central longitudinal section. Fig. 3 is a face view of a portion. Fig. 4 is a section on the line $x\,x$ in Fig. 2, and Fig. 5 is an end view of a portion.

Similar letters of reference indicate corresponding parts in all the figures where they occur.

A is a crockery water-closet bowl, and B a metallic coupling-pipe which is united therewith. The bowl is formed with a thick lip, A′, on its exterior, surrounding the hole $a$, at a little distance therefrom. The exterior of this lip is circular. The interior presents an oblong aperture, $a'$. The inner face of the lip is undercut part way around, terminating in a radial shoulder or offset, as indicated by $a^2$. (See dotted lines in Fig. 3 and strong lines in Fig. 4.)

The inner end of the coupling-pipe B is formed with two wings, B′ B′, on its exterior. Each wing is formed with a square offset at one edge, and the other edge gradually narrowing in an approximately volute curve until its exterior is in or near the general cylindrical surface of the pipe B. The main portion of B is threaded, as indicated by $b$.

C is a thin metallic nut matching the threads $b$, and D is a gasket or packing-ring of vulcanized rubber with woven fabric.

E E′ is a flanged pipe, which is joined to the coupling-pipe B by an internally-flanged nut or "union," G, a packing-ring, F, being interposed in the ordinary manner. The mode of joining the pipes B and E is well known and has been long approved.

In uniting the metallic coupling-pipe B to the crockery article A A′ the nut C and elastic washer D must be screwed back out of the way, or preferably not yet applied. The winged end of the pipe B is applied with its wings B′ coinciding with the long axis of the hole $a'$. It is introduced in this position and then turned a quarter-revolution, so as to bring the square end or edge of each wing B' against the corresponding square shoulder or offset in the corresponding recess, $a^2$. Holding it in this position, the space within the oval hole $a'$ not occupied by the corresponding wings B' is filled with melted sulphur or other semi-liquid material, $m$, which will subsequently harden and insure the tightness of the joint in the same manner as joints have long been stopped by cement in water-pipes. The surfaces are thinly coated with white lead in a soft condition, and the gasket or elastic washer D is put in place and the nut C is screwed down thereon, making a handsome finish, and by the aid of the white lead and the adhesion induced thereby making additional security for the tightness of the joint.

My joint is strong. The relatively small wings B' may, by virtue of the great strength of their material, easily bear the strain to which they can be subjected; but the lip A', by virtue of the relative weakness of its material, is not naturally of equal strength. My construction favors the weak material. There is no salient point in the crockery which can be engaged by the flange of the pipe so as to subject it to excessive strain. The undercut spaces $a^2$, in which the wings are engaged by turning, are strengthened by the form employed. The construction resists the strain pulling the pipe B away from the bowl A by square bearings presented by the working-faces of the wings B'.

Parts of the invention can be used without the whole. I can dispense with the soft coating on the elastic washer D or with the elastic washer itself. In such case I can dispense with the nut C. I prefer the whole used together.

I claim as my invention—

1. In a coupling for water-closet bowls, the crockery lip A', having the oval hole $a'$ and undercut recesses $a^2$, the latter each formed with a square offset at one edge, and the coupling-pipe B, having wings B', each having a corresponding offset, in combination with each other and with a filling, $m$, adapted to tighten the joint, while the locking of the wings holds the parts together, as herein specified.

2. The bowl A, having a lip, A', with the oval aperture $a'$ and recesses $a^2$, the latter having each a square offset, in combination with a screw-threaded coupling-pipe, B, having wings B', each with a square offset, and with the nut C and elastic washer D, all arranged to serve substantially as herein specified.

In testimony whereof I have hereunto set my hand, at Trenton, New Jersey, this 9th day of November, 1888, in the presence of two subscribing witnesses.

HERBERT MACHIN.

Witnesses:
 JAMES H. HAMMOND,
 EDWARD C. STOVER.